H. ADAMS.
Gate.
No. 58,965. Patented Oct. 23, 1866.
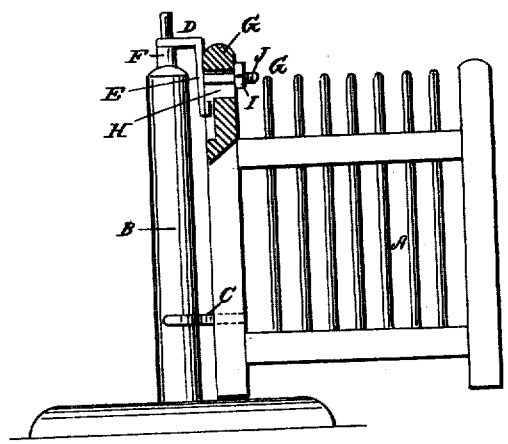
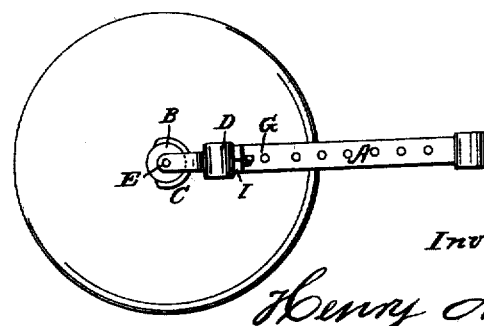

UNITED STATES PATENT OFFICE.

HENRY ADAMS, OF SEATTLE, WASHINGTON TERRITORY.

IMPROVEMENT IN GATES.

Specification forming part of Letters Patent No. 58,965, dated October 23, 1866.

*To all whom it may concern:*

Be it known that I, HENRY ADAMS, of Seattle, in the county of King and Territory of Washington, have invented a new and useful Improvement in Gates; and I do hereby declare that the following is a full, clear, and exact description thereof, which will enable others skilled in the art to make and use the same, reference being had to the accompanying drawings, forming part of this specification.

The present invention relates to the hanging of gates to their posts; and consists in so hanging them that when so desired, in case of a heavy fall of snow, the gate can be hung or adjusted in height to the level of the same, so as to swing clear and free of all obstructions.

In the accompanying plate of drawings my improvement is illustrated—

Figure 1 being a plan or top view of a gate hung according thereto, and Fig. 2 a front elevation with a portion of the gate broken out or in section to more fully illustrate the manner in which it is hung.

Similar letters of reference indicate like parts.

A in the drawings represent a gate, which may be made of any suitable material and construction, and B the post, to which the gate is hung by a circular shaped hinge, C, at or near its lower end, and by the eye D of a hinge, E, over the center-pin F of the upper end of the gate-post B, which hinge E is secured to the gate by means of its screw-bolt or shaft G passing through the vertical slot H of the gate, and having a nut, I, screwed upon its end J.

By loosening the nut I the gate is then free to be set at any desired height within the limits of its vertical slot H, according as may be necessary to adapt the gate to the surface of the ground over which it is to swing—as, for instance, when the ground is covered to a considerable depth with snow. When tightening the said nut against the gate it can be then secured at such height, as is obvious without any further explanation.

I claim as new and desire to secure by Letters Patent—

A gate hung to its post by means of a hinge, E, which passes through a vertical slot, I, and is held to the gate by a nut, J, substantially as herein described, and for the purpose specified.

HENRY ADAMS.

Witnesses:
GARDNER KELLOGG,
A. S. PINKHAM.